(12) United States Patent
Soldavini

(10) Patent No.: US 6,209,703 B1
(45) Date of Patent: Apr. 3, 2001

(54) METHOD AND APPARATUS FOR THE SORTING OF OBJECTS

(75) Inventor: Attilio Soldavini, Ferno-VA (IT)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/221,157

(22) Filed: Dec. 28, 1998

(30) Foreign Application Priority Data

Dec. 29, 1997 (IT) ............................. MI97A002884

(51) Int. Cl.$^7$ ................................................. B65G 15/22
(52) U.S. Cl. ................................ 198/370.06; 198/358
(58) Field of Search ............................. 198/358, 370.1, 198/370.06, 447

(56) References Cited

U.S. PATENT DOCUMENTS

| | | | |
|---|---|---|---|
| 3,254,752 | * | 6/1966 | Bauch et al. ......................... 198/358 |
| 4,915,209 | * | 4/1990 | Canziani ..................... 198/370.06 X |
| 5,367,466 | | 11/1994 | Canziani . |
| 5,547,084 | * | 8/1996 | Okada et al. ................ 198/370.06 X |
| 5,588,520 | * | 12/1996 | Affaticati et al. ................ 198/370.06 |
| 5,868,238 | * | 2/1999 | Bonnet ................ 198/370.1 |
| 5,901,830 | * | 5/1999 | Kalm et al. ..................... 198/370.06 |

FOREIGN PATENT DOCUMENTS

| | | | |
|---|---|---|---|
| 0 481 341 A1 | * | 4/1992 | (EP) . |
| 0 518 180 | | 12/1992 | (EP) . |
| 0 556 866 | | 8/1993 | (EP) . |
| 6-127662 | * | 5/1994 | (JP) ................................. 198/370.06 |

* cited by examiner

Primary Examiner—Janice L. Krizek
(74) Attorney, Agent, or Firm—Burns, Doane, Swecker & Mathis, L.L.P.

(57) ABSTRACT

An object-sorting system includes a plurality of conveyor platforms traveling along a travel path between a loading zone and an unloading zone. The unloading zone includes a plurality of exits spaced apart along the travel path for receiving respective ones of the objects. Each conveyor platform receives and unloads objects in a direction transverse to the travel path. Two objects are loaded onto each platform so that the first object to be unloaded is disposed closest to the side of the platform from which it is to be discharged. The loading station is arranged to load the two objects without stopping the conveyor platform. The loading station includes two loading conveyors arranged to load objects onto each platform at respective locations along the travel path.

11 Claims, 4 Drawing Sheets

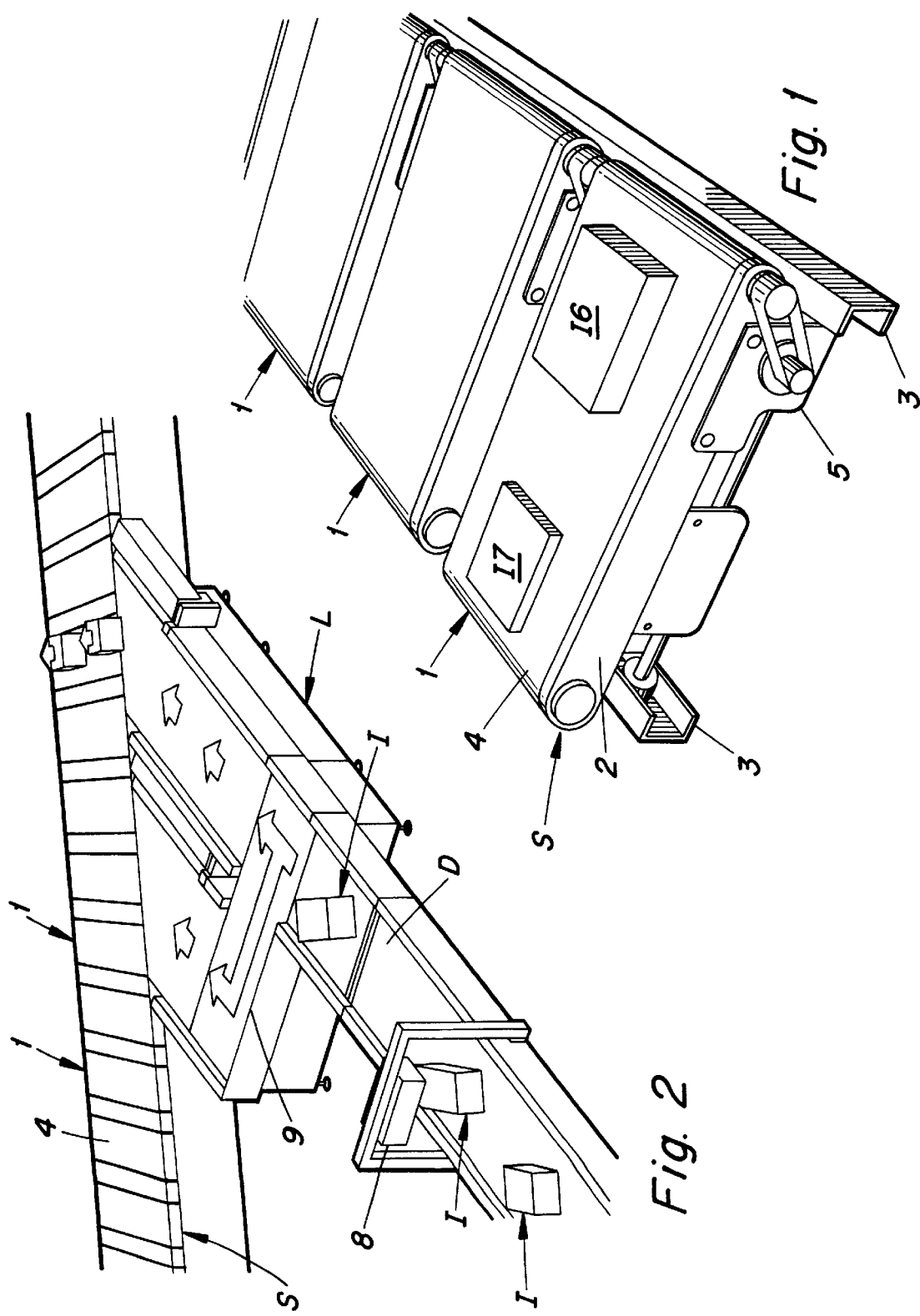

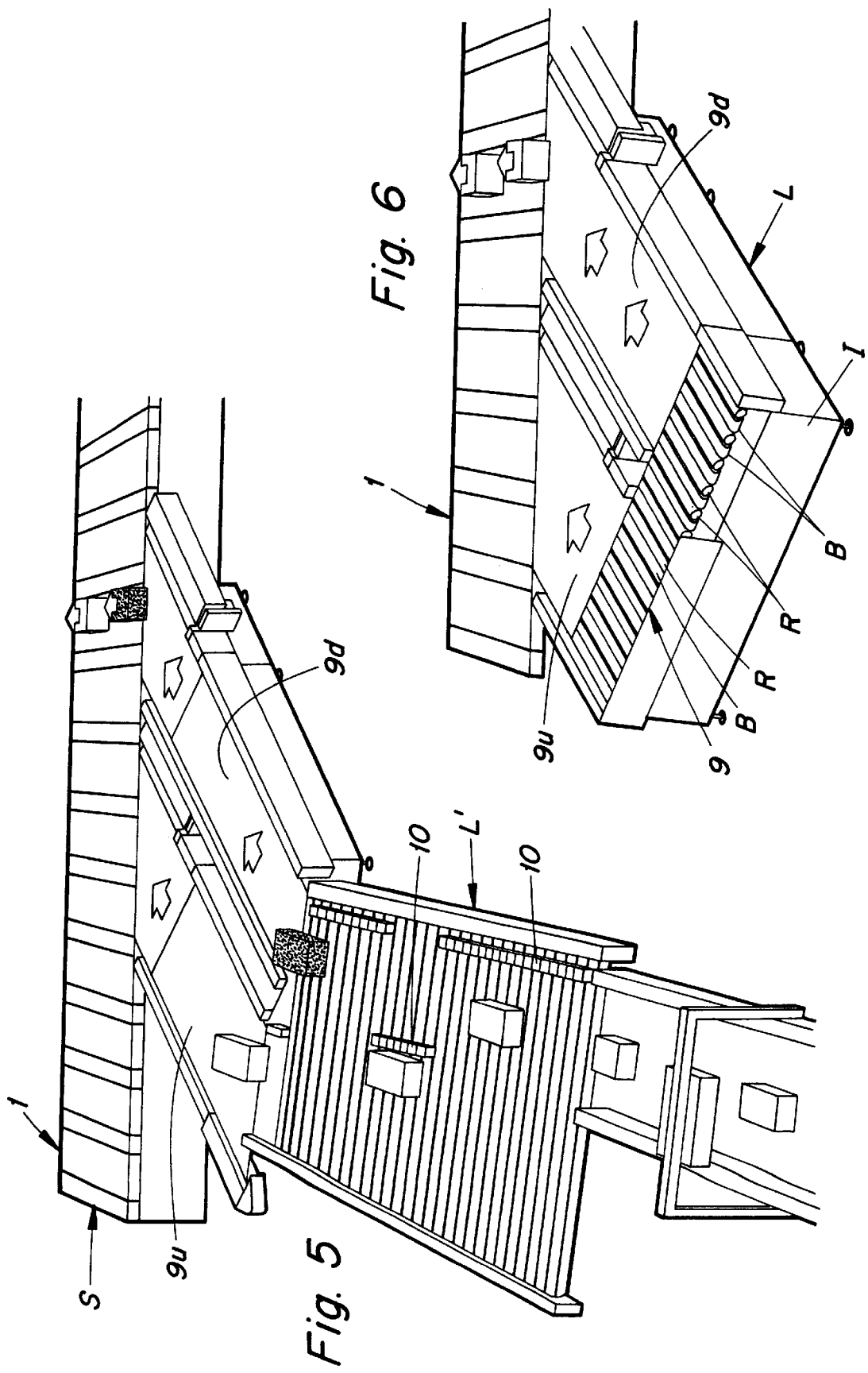

METHOD AND APPARATUS FOR THE SORTING OF OBJECTS

BACKGROUND OF THE INVENTION

The present invention proposes a method and an equipment for the automatic sorting of objects, such as mailed parcels.

Conventional sorting machines capable of the highest productivities, are basically divided into three types, i.e., tilt trays, shoe sorters, and cross belts. The type used depends on the solutions adopted for the unloading of the objects to the destination.

With tilt trays: the conveyor unit, usually comprising a tray of a material with low friction mounted on a truck, is turned over at the destination so that the object on board is accelerated laterally by the gravity force, and reaching then the destination.

With shoe sorters: a succession of conveyor units, dragged by chains forms a conveyor belt; each conveyor unit comprises a shoe sorter element which can be controlled to move through the conveyor platform in a direction orthogonal to the advancing direction of the machine, to push the object to the destination.

Usually this equipment is fitted with very short conveyor units so that it is possible to apply to each object to be sorted a number of shoe sorters which, when combined are able to accommodate the objects length. This is a very useful solution to optimize the productivity when objects having different dimensions are to be sorted.

With cross belts: a sorting machine is formed by a series of trucks fitted with conveyor belts, the conveyor and sorting elements, oriented perpendicularly with respect to the direction of the sorting machine, which are actuated for the unloading in order to direct the object towards the collecting means at the sides of the route.

The cross belt equipment has reached considerable levels of sophistication since the belt unloading has very precise control functions. Sorting machines are known, in which each object is measured, in order to be loaded exactly in the middle of the belt whereupon its correct positioning is checked, and controlling, when necessary, the movement of the belt to correct the centering.

When unloading, the control actuates the belt with leads and acceleration ramps which are a function of the advancing speed, or of the object's position on the belt, or of the object's dimension, or sometimes the kind of the object, in order to assure the greatest unloading precision even though very different objects are being handled.

The above-described equipment is described, for example, in the European Patents No. 0 481 341, No. 0 518 180 and No. 0 556 866, to which reference is made for more details.

All the known types of equipment have limited productivity. That is, the number of objects that the machine is capable of sorting in a time interval is limited, as determined essentially by the fact that the advancing speed of the machine must be lower than 2 m/sec in the greatest part of the facility. At this speed, a sorting machine comprising, for example a continuous succession of units having a pitch (spacing) of 500 mm, will drive 14400 units per hour to an object loader, and will sort as many objects per hour, provided that any unit is capable of receiving and sorting an object during any revolution of the machine.

For small objects to be sorted (dresses, books, envelopes, little parcels) the above-mentioned value represents virtually the actual technological limit. More elevated speeds of the sorting machine would involve longer transients of acceleration during the loading with greater problems of precision due to the sliding and rolling effects of the objects.

Furthermore speeds near 2 m/sec may cause effects that compromise the reliability of the treatment of light-weight objects, due to the braking action of the air resistance, these effects getting rapidly worse with the increasing of the speed.

The productivity limits of the existing sorting techniques make their use difficult or impossible in certain applications. That is, the concentration of the objects in some facilities may require the automatic sorting of object flow rates higher than those obtainable by known sorting machines, and towards a greater number of destinations.

In order to satisfy these requirements numerous solutions have been realized using the available machines, but, with results not very satisfying because of complexity and high prices.

In order to double productivity, a first previously-proposed solution involves the use of two sorting machines moving along parallel routes and unloading the objects towards common exits. (It is the case, for example of two superposed sorting machines.)

That solution is however very expensive because it requires two complete machines, more space, and also because the sorting towards common exits creates new complexities, for example the necessity of introducing conveyor belts and controls at the destination in order to drive both machines with order and without crashes, to sort the objects at the destination. Therefore, this solution is suitable only in the case of applications with high productivity and a low number of destinations.

Another technique, largely used when the application involves a high number of destinations and a productivity higher than that of a single sorting machine, consists in the use of so-called "presorting". That technique involves the use of two machines in parallel and the division of the number of exits between these two machines. Basically, one of the machines will unload at half of the exits and the other machine will unload at the other half of the exits.

In practice, it is necessary to divide the entering objects in two principal directions, each direction having half of the final destinations. Since downstream of the presorting station two sorting machines are used, each one with half of the total number of destinations, it will be possible to obtain the required productivity provided that the two flow rates of the presorted objects are maintained constantly equal.

This condition is in reality very onerous and involves many complexities and costs both for dividing the entering objects, and for realizing suitable accumulations of objects presorted so that to reduce unbalancements between the two flows directed towards the sorting machines.

Even if it can be assumed that the destinations of the two groups are equiprobable, during the presorting in a short period, the objects are not usually divided equally between the two directions.

Without suitable dynamic accumulations these imbalances would constantly produce a loss of productivity because if one machine became saturated, it would slow the flow of entering objects, while the other machine would have an incompletely used production capacity.

Therefore it is possible to understand how sorting machines can encounter very expensive costs, and great complexity when efforts are made to increase productivity.

SUMMARY OF THE INVENTION

Now the present innovation proposes a method and apparatus for the sorting of parcels which permits a more simple solution to the problem of achieving elevated productivity. The invention makes possible, as it will be shown hereafter in detail, to double the production capacity of the sorting machines existing nowadays, combining the favorable characteristics of a sorting unit provided with belts, able to perform repeated controlled shiftings in the two senses, with the observation that, with two objects to be sorted it is always possible to establish the order in which the objects are arranged on the same sorting unit, so that they could be sorted at the destination with successive activations of the belt.

The machine proposed is a sorting machine with sorting units dimensioned in such a way that on board each unit, two objects can be loaded, instead of one as in the existing sorting machines.

The objects are loaded on the unit by two successive activations, ordered when loaded so that it can be possible to sort them to their respective destinations by means of successive activations of a belt on the unit.

In order to do this, i.e., in order to be able to use the one and only possibility offered by the belt, as a sorting unit of multiple objects, it is sufficient, if there are two objects whose destinations are known, to establish the order of their loading on the belt is, in such a way that the first to be sorted is by the side corresponding to its destination.

In this way each sorting unit will be able to sort two objects for each revolution of the sorting machine, so that the effective production will be equal to the double of the production expressed in cells per hour.

In reality, an exactly double production rate will be obtained in the case of sorting machines with monolateral exits, as compared with machines having exits placed only on one side of the sorting machine. In the case of machines with bilateral exits, the productivity will be a little smaller because some situations occur, in which only one of the objects loaded on the belt can be sorted because the other object's exit is the directly opposite exit.

In the practical cases, the effects are negligible. For example, in an installation with 200 bilateral destinations, supposing that, because of the high speed of the machine, after the unloading of an object at a particular first destination, it is not possible to unload the other object from the unit, because the unit will have too quickly passed the destination of the other object.

Supposing that, all the destinations equiprobable, given a pair of objects, the probability of having such a condition occur, i.e., where only one of the two objects can be sorted during the revolution (travel cycle) of the unit, is equal to 3/200.

Therefore, considering the work of 10000 units per hour, 150 of those units (i.e., 10000×3/200) will sort only one of the two objects during each rotation (cycle) of the machine, while the remaining 9850 will sort both objects. equal The total productivity will be equal to 19850 objects per hour, with a loss equal to 0.75%.

In practice, the loss will be more limited because not all of the destinations are equiprobable, that is, it is typical for some of the destinations to collect a great percentage of the object flow. It will be sufficient therefore to space apart the important exits so that they are distant one to another in order to further reduce the probability of the abovementioned occurring condition.

BRIEF DESCRIPTION OF THE DRAWING

The objects and advantages of the invention will become apparent from the following detailed description of preferred embodiments thereof in connection with the accompanying drawings in which like numerals designate like elements, and in which:

FIG. 1 shows a sorting machine with cross belts; it comprises conveyor platforms that move on rails, which are platforms connected one another by means of ties articulated in such a way to form a continuous train.

FIG. 2 shows a possible configuration of a loading station which is capable of loading pairs of objects on the same conveyor platform.

FIG. 5 shows a first embodiment of equipment for the loading of objects in sorting machine according to the invention.

FIG. 6 shows a second embodiment of a loading equipment according to the invention.

DETAILED DESCRIPTION OF THE PREFERRED EMBODIMENTS OF THE INVENTION

Figure 3A:
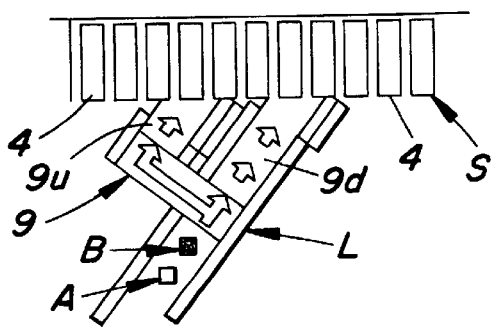
FIGS. 3a to 3f show the time sequence of loading objects.
Figure 3B:
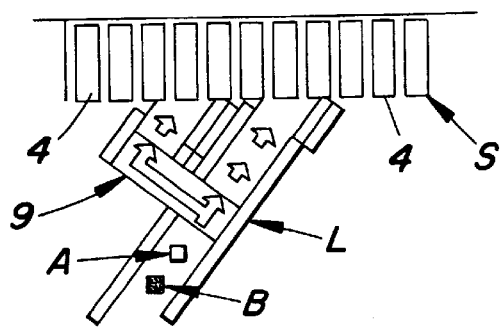

With reference to FIG. 1, there are depicted a sorting line S, and a loading station L. The sorting line S comprises a plurality of belt units, each capable of loading two objects. The belt units move at a constant speed along a closed route, driven by electrical motors arranged on board.

For example, the sorting line S comprises a plurality of conveying platforms, preferably belt units 1, each belt unit comprising a truck or conveyor platform 2 which moves along rails 3.

On each truck a sorting conveyor, preferably a belt 4, is mounted, which is driven by a servomotor 5. Onto each belt 4 are loaded, in pairs, the objects to be sorted (e.g., see objects 16 and 17 in FIG. 1).

The belts 4 are preferably actuated by means of servo-amplifiers with speed feedlock, so that the activation can be independent of the weight of the objects conveyed.

The control permits constant and limited accelerations, so that the sliding phenomena of the objects on the belt 4 is negligible.

Thanks to these characteristics the control technique permits the attainment, with precision and repeatability, of the multiple belt shiftings which are necessary for the treatment of two objects, according to the present invention.

In the same way, the consolidated loading techniques of an object onto a belt sorting unit, permitting a precise control of the final position of the object on board, offer the possibility that after a first object is loaded by a first or upstream loading conveyor, preferably a belt 9u of the loading station L, a second object is transferred on board in the same way, by means of a second or downstream loading conveyor, preferably a belt 9d. The loading techniques involve the use of the loading belts 9u, 9d, oriented at an angle of 45° with respect to the direction of travel T of the sorting line S. The loading belts are able to accelerate the object to obtain a synchronized loading onto the sorting belt 4. The loading is executed at the moment of the arrival of each object at the sorting belt 4 in such a way that the object is transferred without sliding.

As shown in FIG. 2, at the loading station L which is capable of loading pairs of objects onto the same sorting belt, the objects, each provided with a bar code, are conveyed along a delivery belt D and identified by a reading station 8.

After having thereby determined the respective destinations of a pair of objects, one or the other object is shifted to the upstream loading belt 9u by means of a transfer conveyor 9 of a known type which is selectively capable of respective orthogonal movements, i.e., sideways or forwards. Examples of such a transfer conveyor will be described later.

Figure 3C:
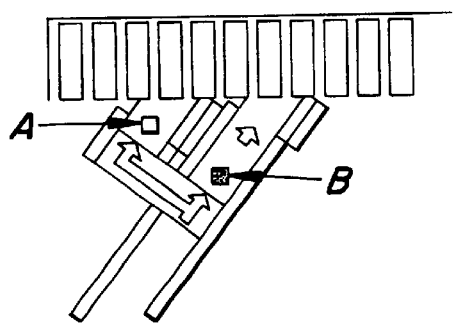
Figure 3D:
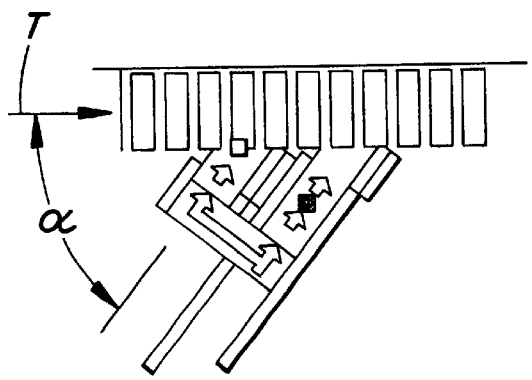
Figure 3E:
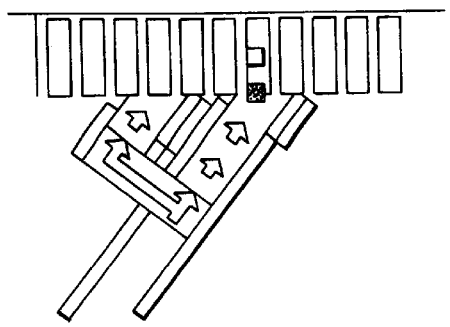
Figure 3F:
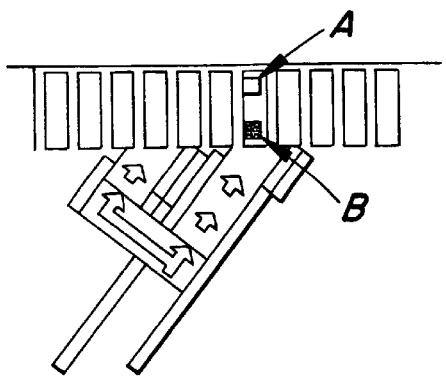
Figure 4A:
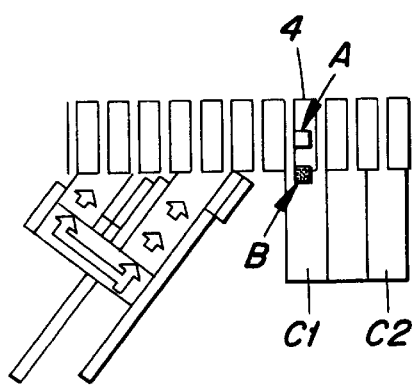
FIGS. 4a–4c show an unloading sequence when exits are located on only one side of the conveyor platforms.
Figure 4D:
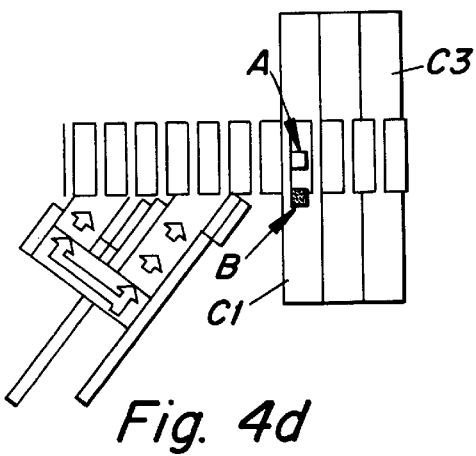
FIGS. 4d–4f show an unloading sequence when exits are located on both sides of the conveyor platforms.
Figure 4B:
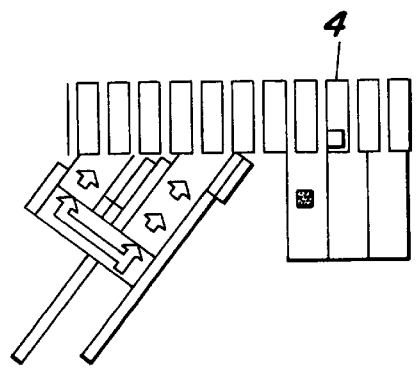
Figure 4E:
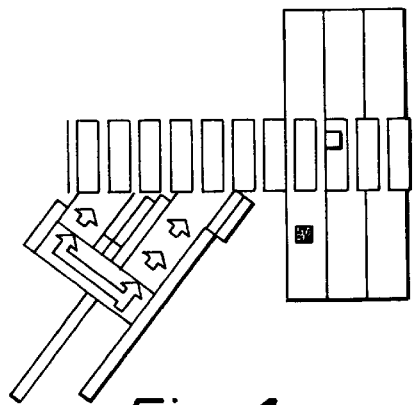
Figure 4C:
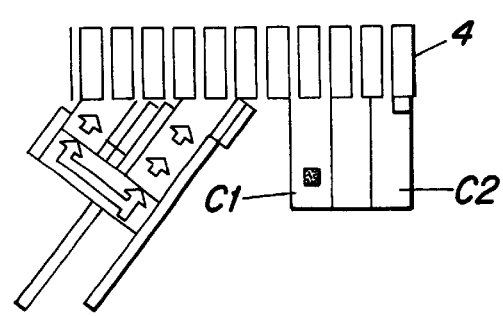
Figure 4F:
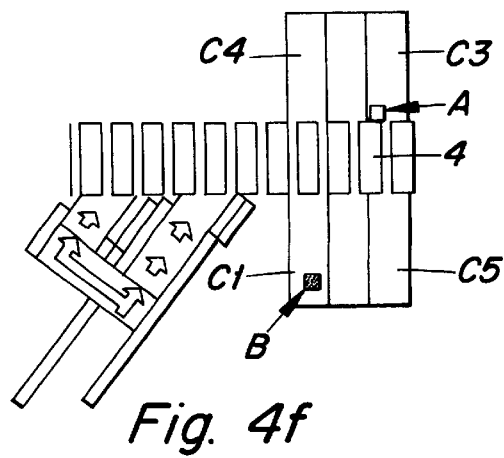

FIGS. 3a–3f show the time sequences of two possible loading cases, while FIGS. 4a–4c show the two objects being sorted to the destinations during successive steps. FIGS. 4d–4f show another manner of sorting to the destination.

FIGS. 3a to 3f show the example in which a parcel A must be loaded on a belt 4 before a parcel B.

In a first case, the parcel B arrives at the loading station before the parcel A (FIG. 3a), whereupon the parcel B is advanced forwardly by the transfer conveyor 9 and then the parcel A is deviated sideways by the transfer conveyor 9.

In a second case, the parcel B arrives at the loading station after the parcel A (FIG. 3b), whereupon the parcel A is deviated sideways on the loading line and then the parcel B is moved forwardly.

In both cases the situation shown in FIG. 3c is reached, in which the parcel B is on the downstream loading belt 9d, and the parcel A is on the upstream loading belt 9u.

After the loading action, the two parcels are arranged on a sorting belt 4 as shown in FIG. 3f.

When unloading, there are two possible cases, i.e., both parcels are unloaded at the same side of the sorting line (FIGS. 4a–4c), or both parcels are unloaded at opposite sides thereof (FIGS. 4d–4f).

In the first case, if the parcel B is to be unloaded before the parcel A, the sorting belt 4 is activated to make the parcel B exit onto an exit line C1, e.g., as the unit 4 keeps moving (FIG. 4a). Simultaneously, the parcel A is shifted but remains on the belt 4 even after the parcel B has been unloaded (FIG. 4b).

Then, the parcel A, when the belt 4 arrives at the corresponding exit line C2, is unloaded by activating the belt 4 in the same direction (FIG. 4c).

On the contrary, in case the two parcels must be unloaded on opposite sides, the belt 4 is first activated in the unloading direction of the first of the two parcels to reach its exit line (for example unloading of the parcel B in FIG. 4d), with the parcel A shifting therewith, but remaining on the belt 4.

The belt 4 is then activated in reverse in order to bring the parcel A back to the original position (FIG. 4e) and thereafter, near the corresponding exit line C3, the parcel A is unloaded by activating the belt 4 in the direction opposite to the previous one (FIG. 4f).

Thus it will be appreciated that in FIGS. 4a–4c as well as in FIGS. 4d–4f, the parcels must be loaded such that the first parcel to be unloaded is situated closest to the side of the belt 4 from which it is to be unloaded. Note that in FIGS. 4d–4f, if the parcel A were to be unloaded at exit line C4, and the parcel B were to be unloaded at exit line C5, then the loading of the parcels A, B could still be performed in the same order as shown in those figures, i.e., parcel A could be loaded first even if it is the first to be unloaded.

As shown in FIG. 6, the transfer conveyor 9 could comprise, for example, a known arrangement comprising: driven parallel rollers R for transporting an object in either of the two orthogonal directions, e.g., sideways as shown, and driven parallel belts B arranged in alternating relationship with the rollers for driving an object in the other direction (i.e., forwardly as shown). The belts B could be raised to a level above the rollers when it is necessary for the belts to take over the driving of an object.

Alternatively, the transfer conveyor could, in the applications with regular objects which can be easily treated, comprise simple transfer devices or deviators disposed in a fixed position after the reading station of the bar code.

In the more complicated cases, with objects which are more difficult to treat, it would be possible to use a loading station L' having a pushing means, as shown in FIG. 5, in which a pusher element 10 pushes the objects towards one side or the other of a roller conveyor, in order to position the objects selectively toward inlets of the upstream and downstream belts 9u, 9d which load them on the sorting line S.

It is also possible to use manual solutions for the loading; in such a case human operators would load pairs of objects on the loading belts 9u, 9d, or directly on the sorting belts 4, after having read the bar code of the objects with a laser gun and consequently having received from the computer the information concerning the order of the two objects.

In order to load pairs of ordered objects it is possible to take advantage of the possibility given by the multiple loading stations; in this case the loading stations could be conventional belt stations, oriented at 45° with respect to the machine, and arranged in sequence.

In this case, supposing that a station loads an object onto one sorting belt, there is a great probability that on the delivery belt D there is available at least one object which has a suitable destination to enable it to be loaded on the same sorting belt. This method is a probabilistic one, and, therefore adequate safety margins must be considered on the value of the practical productivity, unlike the method before described, where the automatic order of each pair of objects is deterministic and therefore assures the double productivity.

In spite of this, the probabilistic method could be economically interesting in particular applications, since it would permit an average productivity higher by at least 60%, with respect to the productivity of a conventional, inexpensive machine.

Although the invention has been described as placing a pair of objects on the same sorting belt, it will be appreciated that in order to increase the productivity of the sorting machine even further, three or more objects could be placed on the same sorting belt, in order to obtain higher capacities.

Instead of spacing the objects horizontally on each unit 1, they could be spaced vertically, i.e., a stacking upon the sorting unit 1 in a different order according to the unloading priority. For example, for applications with thin objects, i.e., books, envelopes, clothes, it is possible to envision the sorting unit 1 being fitted on its upper side with a suitable loader that can load objects into different vertically spaced zones of the unit. At each activation of the sorting belt, the loader would provide for the vertical conveyance of the objects, making them shift down by one position and therefore feeding the belt with objects in sequence.

A skilled person will be able then to foresee various changes and variations in order to obtain solutions with an elevated productivity, or to obtain the productivity requested by the sorting machine with a very low advancing speed.

The changes and variations will have to be however included in the field of the present invention.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Method for sorting objects employing a plurality of conveyor belts arranged one after the other for travel along a path of travel extending between a loading zone and an unloading zone, the unloading zone comprising a plurality of exits arranged along the travel path, each conveyor belt arranged to unload the objects in a direction extending transversely of the travel path, the method comprising the steps of:

loading a plurality of the objects sequentially onto one of the plurality of conveyor belts, wherein an object which is a first of the objects to be unloaded is situated closest to a side of the conveyor belt from which it is to be unloaded; and unloading the objects sequentially from the conveyor belt at respective ones of the exits.

2. The method according to claim 1 wherein a sequence of loading the objects onto the conveyor belt is the reverse of a sequence of unloading the objects from the conveyor belt.

3. The method according to claim 1 wherein only two objects are loaded onto the conveyor belt.

4. The method according to claim 1 wherein the objects are loaded onto the conveyor belt in the transverse direction.

5. The method according to claim 1 wherein the objects are loaded onto a respective conveyor belt while the conveyor belt is moving, whereby a first object is loaded while the conveyor belt is located upstream of a location where a second object is to be subsequently loaded thereon.

6. An apparatus for sorting objects comprising:

a loading zone for loading objects, an unloading zone including a plurality of exits spaced apart along a travel path;

a plurality of conveyor platforms arranged one after the other for travel along the travel path between the loading zone and the unloading zone, each conveyor platform including a support surface for receiving a plurality of the objects and for discharging the objects in a direction oriented transversely of the travel path;

the loading zone including a plurality of loading devices spaced along the travel path for loading respective objects onto each conveyor platform at locations spaced along the travel path; and a transfer device for receiving the objects and delivering the objects to selected ones of the loading devices.

7. The apparatus according to claim 6 wherein the transfer device comprises first and second conveying devices, the first conveying device arranged to convey objects in a first direction, the second conveying device being raisable to support objects above the first conveyor and convey the objects in a second direction oriented perpendicularly to the first direction.

8. The apparatus according to claim 6 wherein the transfer device includes a conveyor for conveying objects generally toward inlets of the loading devices, and a pusher movable across the conveyor for pushing the objects laterally relative thereto, whereby the objects become aligned with respective ones of the inlets.

9. The apparatus according to claim 6 wherein each platform comprises an endless belt.

10. Method for sorting objects employing a plurality of conveyor platforms arranged one after the other for travel along a path of travel extending between a loading zone and an unloading zone, the unloading zone comprising a plurality of exits arranged along the travel path, each conveyor platform arranged to unload the objects in a direction extending transversely of the travel path, the method comprising the steps of:

loading a plurality of the objects sequentially onto a conveyor platform, whereby an object which is a first of the objects to be unloaded is situated closest to a side of the conveyor platform to which it is to be unloaded; and unloading the objects sequentially from the conveyor platform at respective ones of the exits;

the loading step comprising advancing the plurality of objects along a conveyor onto a transfer device, and actuating the transfer device selectively in:

a first mode wherein both objects are discharged from the transfer device along the same path and in the same order as received by the transfer device, and a second mode wherein the objects are discharged from the transfer device along respective paths and are loaded onto the conveyor platform in a reverse order than they were received by the transfer device.

11. The method according to claim 10 wherein the conveyor platform comprises a conveyor belt, wherein the plurality of objects are loaded onto the conveyor belt.

* * * * *